(12) United States Patent
Matsumoto et al.

(10) Patent No.: US 9,091,607 B2
(45) Date of Patent: Jul. 28, 2015

(54) SENSOR ELEMENT, FORCE DETECTING DEVICE, AND ROBOT

(71) Applicant: Seiko Epson Corporation, Tokyo (JP)

(72) Inventors: Takanobu Matsumoto, Minowa (JP); Toshiyuki Kamiya, Fujimi (JP); Hideaki Oka, Minowa (JP); Hiroki Kawai, Chino (JP); Yasuhiro Shimodaira, Matsumoto (JP)

(73) Assignee: Seiko Epson Corporation (JP)

( * ) Notice: Subject to any disclaimer, the term of this patent is extended or adjusted under 35 U.S.C. 154(b) by 108 days.

(21) Appl. No.: 13/671,127

(22) Filed: Nov. 7, 2012

(65) Prior Publication Data

US 2013/0112010 A1    May 9, 2013

(30) Foreign Application Priority Data

Nov. 8, 2011   (JP) ................................ 2011-244212

(51) Int. Cl.
| | |
|---|---|
| *G01L 1/22* | (2006.01) |
| *G01L 5/16* | (2006.01) |
| *B25J 19/02* | (2006.01) |
| *G01L 5/22* | (2006.01) |
| *B25J 13/08* | (2006.01) |

(52) U.S. Cl.
CPC ............... *G01L 5/167* (2013.01); *B25J 13/085* (2013.01); *B25J 19/028* (2013.01); *G01L 5/226* (2013.01)

(58) Field of Classification Search
CPC .................. F02M 51/0603; B41J 2002/14217; G01L 5/228; G01L 5/22; G06F 3/011; G06F 3/0414; H01L 41/0474; H01L 41/0475
USPC ............... 73/777, 862.041–862.046
See application file for complete search history.

(56) References Cited

U.S. PATENT DOCUMENTS

| | | | | |
|---|---|---|---|---|
| 3,831,043 | A * | 8/1974 | Hoffmann et al. ............ | 310/352 |
| 4,802,371 | A   | 2/1989 | Calderara et al. | |
| 5,289,074 | A * | 2/1994 | Mori ............................. | 310/328 |
| 5,297,430 | A   | 3/1994 | Sonderegger et al. | |
| 6,414,417 | B1* | 7/2002 | Tsuyoshi et al. .............. | 310/366 |
| 6,677,835 | B2* | 1/2004 | Noguchi et al. .............. | 333/193 |
| 7,014,300 | B2* | 3/2006 | Hirota et al. ................... | 347/72 |
| 7,233,099 | B2* | 6/2007 | Sasaki .......................... | 310/365 |
| 7,498,726 | B2* | 3/2009 | Mochizuki et al. ........... | 310/364 |
| 7,518,295 | B2* | 4/2009 | Mochizuki et al. ........... | 310/366 |
| 7,548,012 | B2  | 6/2009 | Cavalloni et al. | |
| 8,104,693 | B2* | 1/2012 | Ono ........................... | 239/102.2 |

(Continued)

FOREIGN PATENT DOCUMENTS

| | | |
|---|---|---|
| JP | 04-231827 | 8/1992 |
| JP | 2007-336685 | 12/2007 |
| JP | 2009-295788 | 12/2009 |

*Primary Examiner* — Max Noori
(74) *Attorney, Agent, or Firm* — Harness, Dickey & Pierce, P.L.C.

(57) ABSTRACT

A sensor element is formed by, when an α axis, a β axis orthogonal to the α axis, and a γ axis orthogonal to the α axis and the β axis are set, laminating piezoelectric substrates and electrodes in the γ axis direction. The sensor element includes connecting sections arranged such that a part of external sections of the electrodes aligns with a part of external sections of the piezoelectric substrates. The connecting sections are arranged not to align with one another in a direction of the γ axis. Conductors that electrically connect the connecting sections and external connecting sections are formed along outer peripheral sections of the piezoelectric substrates.

20 Claims, 11 Drawing Sheets

(56) References Cited

U.S. PATENT DOCUMENTS

| | | |
|---|---|---|
| 2003/0085778 A1* | 5/2003 | Yata et al. .................. 333/186 |
| 2006/0028095 A1* | 2/2006 | Maruyama et al. ...... 310/316.01 |
| 2006/0232173 A1* | 10/2006 | Kobane et al. ................ 310/366 |
| 2009/0295255 A1* | 12/2009 | Nagaya et al. ................ 310/358 |
| 2012/0267987 A1* | 10/2012 | Yuasa ........................... 310/366 |

\* cited by examiner

SENSOR ELEMENT, FORCE DETECTING DEVICE, AND ROBOT

BACKGROUND

1. Technical Field

The present invention relates to a sensor element, a force detecting device, and a robot.

2. Related Art

JP-A-4-231827 discloses a known force sensor which uses piezoelectric materials. In the force sensor, as shown in FIG. 15 of JP-A-4-231827, a signal electrode 15 is held by crystal discs 16 (which are the piezoelectric materials), and a plurality of measuring elements held by metal cover discs 17 are provided.

When the measuring elements disclosed in JP-A-4-231827 are used, in an arithmetic unit for calculating force from an amount of charges excited by charges, which are generated in the crystal discs when force is applied to the measuring elements, and generated in the signal electrodes 15, a wire for extracting the charges has to be connected to the signal electrodes 15. Further, the wire has to be drawn around to the arithmetic unit. Since a space for arranging the wire has to be allocated in the force detecting device, it is difficult to reduce the size of the force detecting device.

SUMMARY

An advantage of some aspects of the invention is to reduce a wiring space by forming a wiring layer on a side surface of a sensor element used in a force detecting device and to provide a small force detecting device.

Embodiments of the invention can be implemented in the following forms or application examples for achieving the above advantage.

APPLICATION EXAMPLE 1

This application example of the invention is directed to a sensor element formed by, when an α axis, a β axis orthogonal to the α axis, and a γ axis orthogonal to the α axis and the β axis are set as space coordinate axes, providing piezoelectric substrates having principal planes including the α axis and the β axis, providing electrodes on the principal planes sides of the piezoelectric substrates, and laminating the piezoelectric substrates and the electrodes in the γ axis direction. A first electrode is provided on one principal plane of a first piezoelectric substrate that detects force in the α axis direction and a second electrode is provided on the other principal plane, a third electrode is provided on one principal plane of a second piezoelectric substrate that detects force in the β axis direction and a fourth electrode is provided on the other principal plane, and a fifth electrode is provided on one principal plane of a third piezoelectric substrate that detects force in the γ axis direction and a sixth electrode is provided on the other principal plane. The first electrode and the second electrode include a first connecting section of the first electrode and a second connecting section of the second electrode arranged such that a part of the external sections of the first electrode and the second electrode overlaps a part of the external sections of the principal planes of the first piezoelectric substrate. The first connecting section and the second connecting section are arranged not to overlap each other in a direction of the γ axis. The third electrode and the fourth electrode include a third connecting section of the third electrode and a fourth connecting section of the fourth electrode arranged such that a part of the external sections of the third electrode and the fourth electrode overlaps a part of the external sections of the principal planes of the second piezoelectric substrate. The third connecting section and the fourth connecting section are arranged not to overlap each other in the direction of the γ axis. The fifth electrode and the sixth electrode include a fifth connecting section of the fifth electrode and a sixth connecting section of the sixth electrode arranged such that a part of the external sections of the fifth electrode and the sixth electrode overlaps a part of the external sections of the principal planes of the third piezoelectric substrate. The fifth connecting section and the sixth connecting section are arranged not to overlap each other in the direction of the γ axis. A first wire that electrically connects the first connecting section and a first external connecting section, a second wire that electrically connects the third connecting section and a second external connecting section, and a third wire that electrically connects the fifth connecting section and a third external connecting section are formed along outer peripheral sections of the first, second, and third piezoelectric substrates. The second, fourth, and sixth connecting sections are connected. A fourth wire connected to a fourth external connecting section is also provided.

With the sensor element according to this application example, parts of the detection electrodes for detecting forces in the α, β, and γ axis directions and ground electrodes (GND electrodes) are arranged to overlap the external sections of the piezoelectric substrates in the direction of the γ axis, whereby wires from the detection electrodes and the ground electrodes to the external connecting sections can be easily electrically connected by forming a film on the outer periphery of the sensor element by, for example, application of paint having electric conductivity, a PVD method, or a CVD method. Since a space for arranging a wiring cord does not have to be provided, it is possible to obtain the sensor element that can form a small force detecting device.

APPLICATION EXAMPLE 2

This application example is directed to the above application example, wherein the first to third piezoelectric substrates include projecting sections in the direction of the γ axis, and the first to sixth connecting sections overlap at least a part of the external sections of the projecting sections.

According to this application example, it is possible to form the electrodes over the entire surfaces of substrate base sections excluding the projecting sections of the piezoelectric substrates or it is possible to set the electrodes in contact with the surfaces by forming the first to fourth wires in the projecting sections. Therefore, it is possible to reduce a detection loss of charges generated by the piezoelectric substrates. Therefore, it is possible to further improve the accuracy of force detection.

APPLICATION EXAMPLE 3

This application example is directed to the above application example, wherein the first to third piezoelectric substrates are formed from quartz, the first and second piezoelectric substrates are Y cut substrates, and the third piezoelectric substrate is an X cut substrate.

According to this application example, quartz is a material that is easily acquired, excellent in workability, and stable for a long period. Quartz can generate stable charges in response to applied force. Therefore, it is possible to obtain the sensor element that realizes a force detecting device excellent in reliability.

APPLICATION EXAMPLE 4

This application example of the invention is directed to a force detecting device including: a sensor element formed by, when an α axis, a β axis orthogonal to the α axis, and a γ axis orthogonal to the α axis and the β axis are set as space coordinate axes, providing piezoelectric substrates including principal planes including the α axis and the β axis, providing electrodes on the principal planes sides of the piezoelectric substrates, and laminating the piezoelectric substrates and the electrodes in the γ axis direction. A first electrode is provided on one principal plane of a first piezoelectric substrate that detects force in the α axis direction and a second electrode is provided on the other principal plane, a third electrode is provided on one principal plane of a second piezoelectric substrate that detects force in the β axis direction and a fourth electrode is provided on the other principal plane, and a fifth electrode is provided on one principal plane of a third piezoelectric substrate that detects force in the γ axis direction and a sixth electrode is provided on the other principal plane. The first electrode and the second electrode include a first connecting section of the first electrode and a second connecting section of the second electrode arranged such that a part of the external sections of the first electrode and the second electrode overlaps a part of the external sections of the principal planes of the first piezoelectric substrate. The first connecting section and the second connecting section are arranged not to overlap each other in a direction of the γ axis. The third electrode and the fourth electrode include a third connecting section of the third electrode and a fourth connecting section of the fourth electrode arranged such that a part of the external sections of the third electrode and the fourth electrode overlaps a part of the external sections of the principal planes of the second piezoelectric substrate. The third connecting section and the fourth connecting section are arranged not to overlap each other in the direction of the γ axis. The fifth electrode and the sixth electrode include a fifth connecting section of the fifth electrode and a sixth connecting section of the sixth electrode arranged such that a part of the external sections of the fifth electrode and the sixth electrode overlaps a part of the external sections of the principal planes of the third piezoelectric substrate. The fifth connecting section and the sixth connecting section are arranged not to overlap each other in the direction of the γ axis. A first wire that electrically connects the first connecting section and a first external connecting section, a second wire that electrically connects the third connecting section and a second external connecting section, and a third wire that electrically connects the fifth connecting section and a third external connecting section are formed along outer peripheral sections of the first, second, and third piezoelectric substrates. The second, fourth, and sixth connecting sections are connected. A fourth wire connected to a fourth external connecting section is formed. The force detecting device includes a first arithmetic unit that calculates force in the α axis direction, a second arithmetic unit that calculates force in the β axis direction, and a third arithmetic unit that calculates force in the γ axis direction. The first external connecting section is electrically connected to the first arithmetic unit. The second external connecting section is electrically connected to the second arithmetic unit. The third external connecting section is electrically connected to the third arithmetic unit. The fourth external connecting section is electrically connected to the ground (GND).

According to this application example, it is possible to obtain a three-axis force detection sensor with a simple configuration. Parts of the detection electrodes for detecting forces in the α, β, and γ axis directions and ground electrodes (GND electrodes) are arranged to overlap the external sections of the piezoelectric substrates in the direction of the γ axis, whereby wires from the detection electrodes and the ground electrodes to the external connecting sections can be easily electrically connected by forming a film on the outer periphery of the sensor element by, for example, application of paint having electric conductivity, a PVD method, or a CVD method. Since a space for arranging a wiring cord does not have to be provided, it is possible to obtain a small force detecting device. Further, it is possible to easily obtain, for example, a six-axis force detecting device including torque measurement as well by using a plurality of the force detecting devices according to the above application example.

APPLICATION EXAMPLE 5

This application example is directed to the above application example, wherein the first to third piezoelectric substrates include projecting sections in the direction of the γ axis, and the first to sixth connecting sections overlap at least a part of the external sections of the projecting sections.

According to this application example, it is possible to form the electrodes over the entire surfaces of substrate base sections excluding the projecting sections of the piezoelectric substrates or it is possible to set the electrodes in contact with the surfaces by forming the first to fourth wires in the projecting sections. Therefore, it is possible to reduce a detection loss of charges generated by the piezoelectric substrates. Therefore, it is possible to obtain the force detecting device having higher accuracy of force detection.

APPLICATION EXAMPLE 6

This application example is directed to the above application example, wherein the first to third piezoelectric substrates are formed from quartz, the first and second piezoelectric substrates are Y cut substrates, and the third piezoelectric substrate is an X cut substrate.

According to this application example, quartz is a material that is easily acquired, excellent in workability, and stable for a long period. Quartz can generate stable charges in response to applied force. Therefore, it is possible to obtain the force detecting device including the sensor element excellent in reliability.

APPLICATION EXAMPLE 7

This application example is directed to the above application example, wherein the sensor element is housed in a housing container including a housing section that houses the sensor element. In the housing container, the first, second, third, and fourth external connecting sections are extended to the housing section. The first, second, third, and fourth wires of the sensor element and the first, second, third, and fourth external connecting sections are electrically connected.

Since the sensor element is housed in the housing container, it is possible to inhibit contact of an external load such as moisture, oil, or gas with the sensor element and obtain the force detecting device that can perform stable force detection.

APPLICATION EXAMPLE 8

This application example is directed to the above application example, wherein the housing container includes a cylindrical housing container body, a housing container substrate arranged in one opening section of the housing container body, and a lid body arranged in the other opening section. The housing section is formed by joining the housing container substrate and the lid body to the housing container body. At least the housing container body and the hosing container substrate are ceramics.

Since the ceramics less easily eroded by an external environment are used for the housing container, it is possible to obtain the force detecting device that can perform stable force detection for a longer period.

APPLICATION EXAMPLE 9

This application example of the invention is directed to a robot including a force detecting device including a sensor element formed by, when an α axis, a β axis orthogonal to the α axis, and a γ axis orthogonal to the α axis and the β axis are set as space coordinate axes, providing piezoelectric substrates including principal planes including the α axis and the β axis, providing electrodes on the principal planes sides of the piezoelectric substrates, and laminating the piezoelectric substrates and the electrodes in the γ axis direction. A first electrode is provided on one principal plane of a first piezoelectric substrate that detects force in the α axis direction and a second electrode is provided on the other principal plane, a third electrode is provided on one principal plane of a second piezoelectric substrate that detects force in the β axis direction and a fourth electrode is provided on the other principal plane, and a fifth electrode is provided on one principal plane of a third piezoelectric substrate that detects force in the γ axis direction and a sixth electrode is provided on the other principal plane. The first electrode and the second electrode include a first connecting section of the first electrode and a second connecting section of the second electrode arranged such that a part of the external sections of the first electrode and the second electrode overlaps a part of the external sections of the principal planes of the first piezoelectric substrate. The first connecting section and the second connecting section are arranged not to overlap each other in a direction of the γ axis. The third electrode and the fourth electrode include a third connecting section of the third electrode and a fourth connecting section of the fourth electrode arranged such that a part of the external sections of the third electrode and the fourth electrode overlaps a part of the external sections of the principal planes of the second piezoelectric substrate. The third connecting section and the fourth connecting section are arranged not to overlap each other in the direction of the γ axis. The fifth electrode and the sixth electrode include a fifth connecting section of the fifth electrode and a sixth connecting section of the sixth electrode arranged such that a part of the external sections of the fifth electrode and the sixth electrode overlaps a part of the external sections of the principal planes of the third piezoelectric substrate. The fifth connecting section and the sixth connecting section are arranged not to overlap each other in the direction of the γ axis. A first wire that electrically connects the first connecting section and a first external connecting section, a second wire that electrically connects the third connecting section and a second external connecting section, and a third wire that electrically connects the fifth connecting section and a third external connecting section are formed along outer peripheral sections of the first, second, and third piezoelectric substrates. The second, fourth, and sixth connecting sections are connected. A fourth wire connected to a fourth external connecting section is formed. The force detecting device includes a first arithmetic unit that calculates force in the α axis direction, a second arithmetic unit that calculates force in the β axis direction, and a third arithmetic unit that calculates force in the γ axis direction. The first external connecting section is electrically connected to the first arithmetic unit. The second external connecting section is electrically connected to the second arithmetic unit. The third external connecting section is electrically connected to the third arithmetic unit. The fourth external connecting section is electrically connected to the ground (GND).

According to this application example, it is possible to obtain the robot capable of performing safe and fine work by surely detecting, with the force detecting device, contact of an operating robot arm or robot hand with an obstacle that occurs during a predetermined action and a contact force with a target and feeding back data to a robot control device.

APPLICATION EXAMPLE 10

This application example is directed to the above application example, wherein the first to third piezoelectric substrates include projecting sections in the direction of the γ axis, and the first to sixth connecting sections overlap at least a part of the external sections of the projecting sections.

According to this application example, it is possible to form the electrodes over the entire surfaces of substrate base sections excluding the projecting sections of the piezoelectric substrates or it is possible to set the electrodes in contact with the surfaces by forming the first to fourth wires in the projecting sections. Therefore, it is possible to reduce a detection loss of charges generated by the piezoelectric substrates. Therefore, it is possible to obtain the robot having high reliability and safety including the force detecting device having high accuracy of force detection.

APPLICATION EXAMPLE 11

This application example is directed to the above application example, wherein the first to third piezoelectric substrates are formed from quartz, the first and second piezoelectric substrates are Y cut substrates, and the third piezoelectric substrate is an X cut substrate.

According to this application example, quartz is a material that is easily acquired, excellent in workability, and stable for a long period. Quartz can generate stable charges in response to applied force. Therefore, it is possible to obtain the robot having high reliability and safety using the force detecting device including the sensor element excellent in reliability.

APPLICATION EXAMPLE 12

This application example is directed to the above application example, wherein the sensor element is housed in a housing container including a housing section that houses the sensor element. In the housing container, the first, second, third, and fourth external connecting sections are extended to the housing section. The first, second, third, and fourth wires of the sensor element and the first, second, third, and fourth external connecting sections are electrically connected.

According to this application example, since the sensor element is housed in the housing container, even if the robot is set in an environment in which moisture, oil, gas, or the like that causes deterioration or the like of the sensor element is present, it is possible to protect the sensor element from an external environment. Therefore, it is possible to maintain, for a long period, reliability of the force detecting device in which the sensor element is housed. It is possible to obtain the robot having high reliability and safety.

APPLICATION EXAMPLE 13

This application example is directed to the above application example, wherein the housing container includes a cylindrical housing container body, a housing container substrate arranged in one opening section of the housing container body, and a lid body arranged in the other opening section. The housing section is formed by joining the housing container substrate and the lid body to the housing container body. At least the housing container body and the hosing container substrate are ceramics.

According to this application example, since the ceramics less easily deteriorated in a harsher external environment are used for the housing container, it is possible to obtain the robot having higher reliability and safety.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
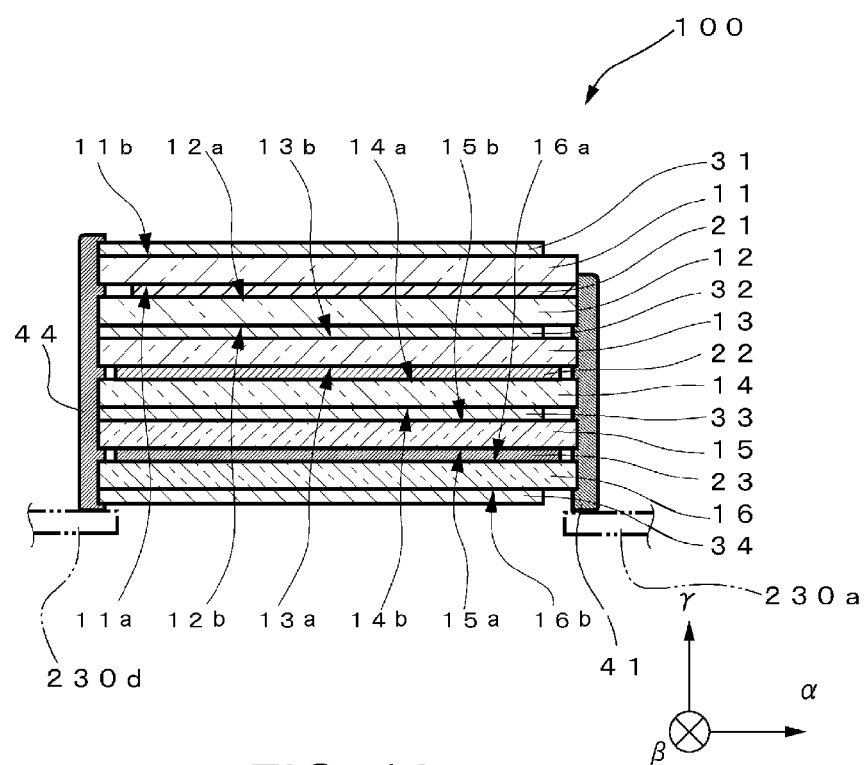
FIG. 1A is a sectional view of a sensor element according to a first embodiment.
Figure 1B:
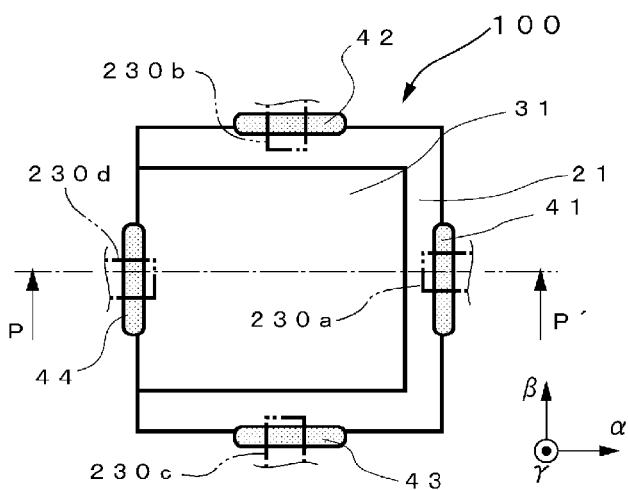
FIG. 1B is a plan view of the sensor element.

Embodiments of the invention are explained below with reference to the accompanying drawings.
First Embodiment FIG. 1A is a sectional view showing a sensor element according to a first embodiment. FIG. 1B is a plan view of the sensor element.

As shown in FIG. 1A of a cross section in a P-P' portion shown in FIG. 1B, in a sensor element 100 according to this embodiment, quartz substrates functioning as piezoelectric substrates, i.e., a first quartz substrate 11 and a second quartz substrate 12 functioning as a first piezoelectric substrate, a third quartz substrate 13 and a fourth quartz substrate 14 functioning as a second piezoelectric substrate, and a fifth quartz substrate 15 and a sixth quartz substrate 16 functioning as a third piezoelectric substrate are laminated in the γ axis direction. A first detection electrode 21 functioning as a first electrode is provided on one principal plane 11a side of the first quartz substrate 11. A ground electrode (hereinafter referred to as GND electrode) 31 functioning as a second electrode is provided on the other principal plane 11b side. The first detection electrode 21 functioning as the first electrode shared with the first quartz substrate 11 is provided on one principal plane 12a side of the second quartz substrate 12. A second GND electrode 32 functioning as the second electrode is provided on the other principal plane 12b side.

A second detection electrode 22 functioning as a third electrode is provided on one principal plane 13a side of the third quartz substrate 13. The second GND electrode 32 of the second quartz substrate 12 is provided on the other principal plane 13b side as a fourth electrode to be shared with the third quartz substrate 13. The second detection electrode 22 functioning as the third electrode shared with the third quartz substrate 13 is provided on one principal plane 14a side of the fourth quartz substrate 14. A third GND electrode 33 functioning as the fourth electrode is provided on the other principal plane 14b side. A third detection electrode 23 functioning as a fifth electrode is provided on one principal plane 15a side of the fifth quartz substrate 15. The third GND electrode 33 of the fourth quartz substrate 14 functioning as a sixth electrode is provided on the other principal plane 15b side to be shared with the fifth quartz substrate 15. The third detection electrode 23 functioning as the fifth electrode shared with the fifth quartz substrate 15 is provided on one principal plane 16a side of the sixth quartz substrate 16. A fourth GND electrode 34 functioning as the sixth electrode is provided on the other principal plane 16b side.

On outer peripheral sections of the laminated quartz substrates 11, 12, 13, 14, 15, and 16, a first wire 41, a second wire 42, a third wire 43, and a fourth wire 44 are formed to be extended in a γ axis direction. The first wire 41 electrically connects the first detection electrode 21 and a first external connecting section 230a explained below. The second wire 42 electrically connects the second detection electrode 22 and a second external connecting section 230b explained below. The third wire 43 electrically connects the third detection electrode 23 and a third external connecting section 230c explained below. The fourth wire 44 electrically connects the GND electrodes 31, 32, 33, and 34 and a fourth external connecting section 230d explained below. Details of the external connecting sections 230a, 230b, 230c, and 230d are explained below.

Figures 2A, 2B:
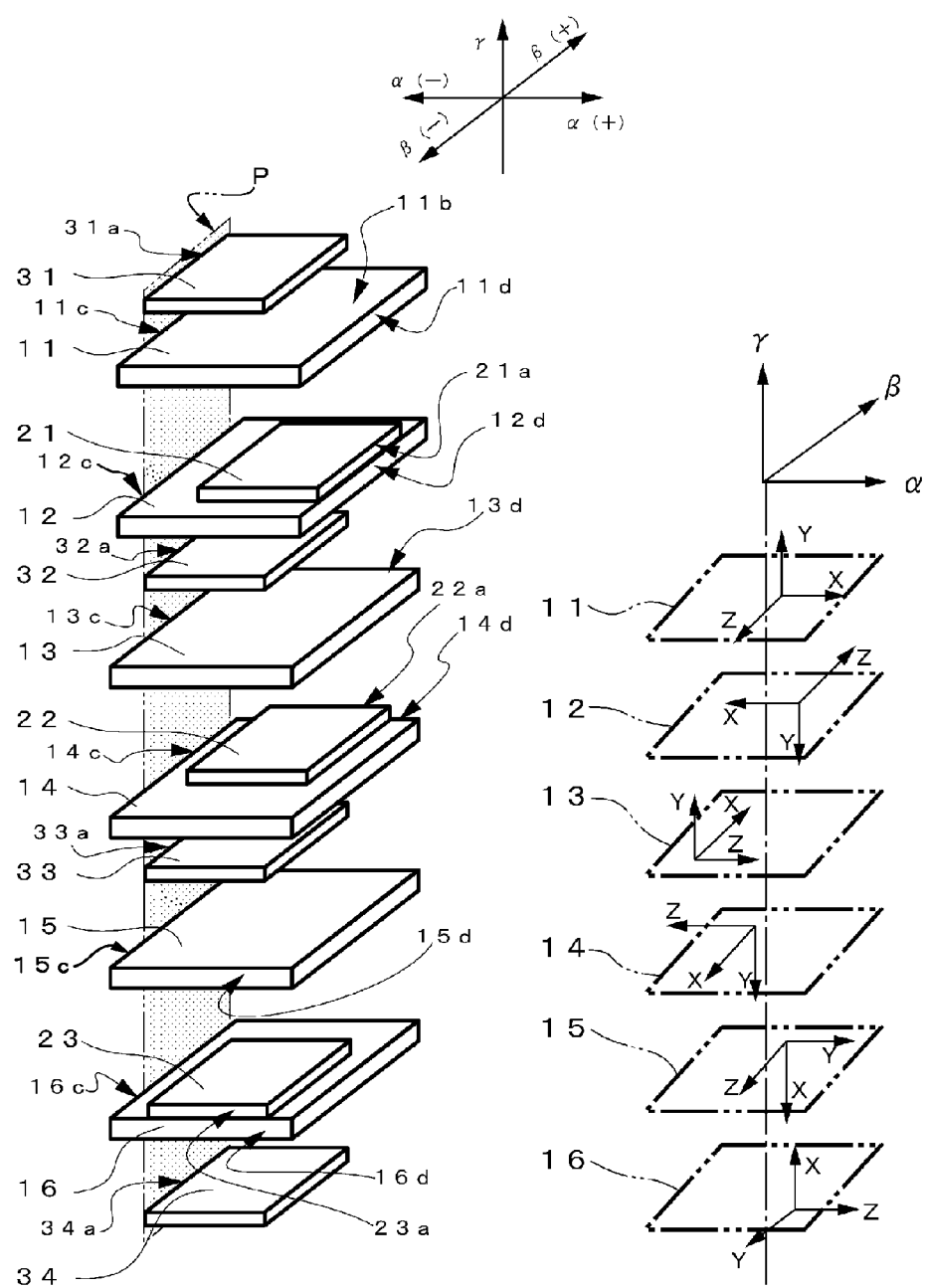
FIG. 2A is an exploded perspective view showing arrangement in the sensor element according to the first embodiment.
FIG. 2B is a configuration diagram showing crystal axis directions of quartz substrates of the sensor element.

FIG. 2A is an exploded perspective view for explaining the arrangement in the sensor element 100 shown in FIGS. 1A and 1B. The arrangement of the quartz substrates 11, 12, 13, 14, 15, and 16, the detection electrodes 21, 22, and 23, and the GND electrodes 31, 32, 33, and 34 is explained with reference to FIG. 2A. The first GND electrode 31 provided on the other principal plane 11b side of the first quartz substrate 11 is arranged such that an external surface 31a in an α(−) direction functioning as a first connecting section is at a position of an imaginary surface P including an external surface 11c in the α(−) direction of the first quartz substrate 11. The imaginary surface P is an imaginary surface including external surfaces 12c, 13c, 14c, 15c, and 16c in the α(−) direction of the other quartz substrates 12, 13, 14, 15, and 16. Like the first GND electrode 31, the other GND electrodes 32, 33, and 34 are arranged such that external surfaces 32a, 33a, and 34a in the α(−) direction are at positions of the imaginary surface P. In other words, the GND electrodes 31, 32, 33, and 34 are arranged such that the external surfaces 11c, 12c, 13c, 14c, 15c, and 16c of the quartz substrates 11, 12, 13, 14, 15, and 16 and the external surfaces 31a, 32a, 33a, and 34a align in the γ axis direction along the surface P.

The first detection electrode 21 functioning as the first electrode is arranged between the first quartz substrate 11 and the second quartz substrate 12 functioning as the first piezoelectric substrate. The first detection electrode 21 is arranged such that surfaces different from the external surfaces 11c and 12c (the surfaces along the imaginary surface P) of the quartz substrates 11 and 12, on which the GND electrodes 31 and 32 functioning as the second electrode are arranged to be aligned, i.e., in this embodiment, the external surfaces 11d and 12d in an α(+) direction align with the external surface 21a in the α(+) direction of the first detection electrode 21 in the γ axis direction.

The second detection electrode 22 functioning as the third electrode is arranged between the third quartz substrate 13 and the fourth quartz substrate 14 functioning as the second piezoelectric substrate. The second detection electrode 22 is arranged such that surfaces in a direction different from the α(+) direction in which the external surfaces 13c and 14c (the surfaces along the imaginary surface P) of the quartz substrates 13 and 14, on which the GND electrodes 32 and 33 functioning as the fourth electrode are arranged to be aligned, and the external surface 21a of the first detection electrode are arranged, i.e., in this embodiment, the external surfaces 13d and 14d in a β(+) direction align with the external surface 22a in the α(+) direction of the second detection electrode 22 in the γ axis direction.

The third detection electrode 23 functioning as the fifth electrode is arranged between the fifth quartz substrate 15 and the sixth quartz substrate 16 functioning as the third piezoelectric substrate. The third detection electrode 23 is arranged such that surfaces different from the external surfaces 15c and 16c (the surfaces along the imaginary surface P) of the quartz substrates 15 and 16, on which the GND electrodes 33 and 34 functioning as the sixth electrode are arranged to be aligned, the α(+) direction in which the external surface 21a of the first detection electrode 21 is arranged, and the β(+) direction in which the external surface 22a of the second detection electrode 22 is arranged, i.e., in this embodiment, the external surfaces 15d and 16d in a β(-) direction align with the external surface 23a in the β(-) direction of the third detection electrode 23 in the γ axis direction.

Figure 3A:
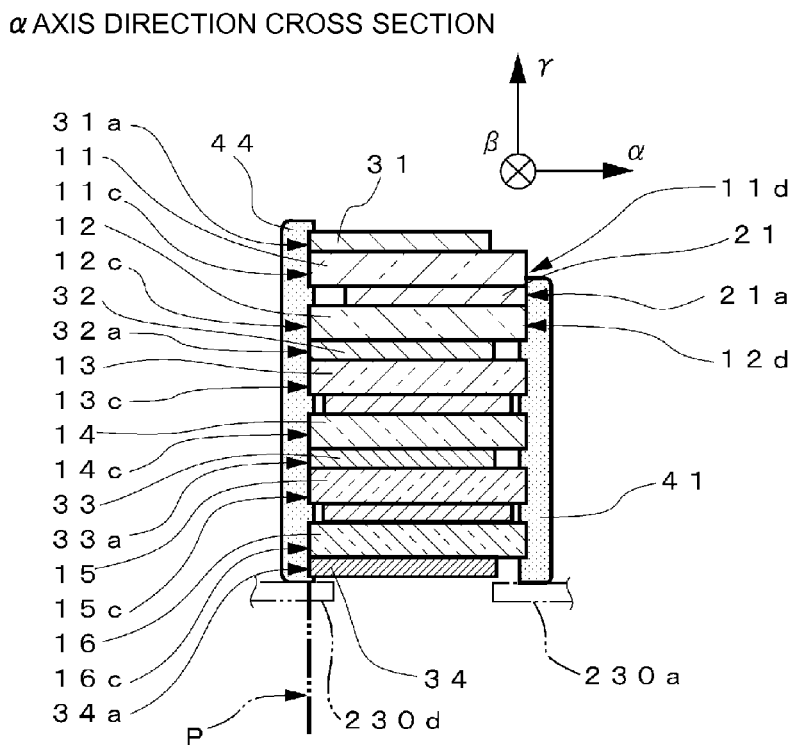
FIG. 3A is an assembled sectional view in an α axis cross sectional direction of the sensor element shown in FIG. 2A.
Figure 3B:
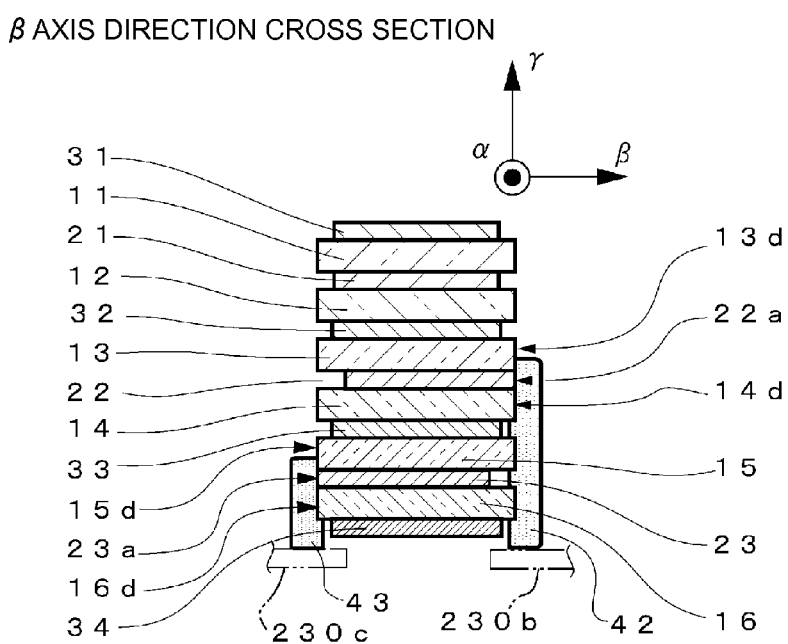
FIG. 3B is an assembled sectional view in a β axis cross sectional direction of the sensor element.

FIG. 3A is a sectional schematic diagram in the α axis cross sectional direction shown in FIG. 2A. FIG. 3B is a sectional schematic diagram in the β axis cross sectional direction shown in FIG. 2A. As shown in FIG. 3A, the external surfaces 11c, 12c, 13c, 14c, 15c, and 16c in the α(-) direction of the quartz substrates 11, 12, 13, 14, 15, and 16 and the external surfaces 31a, 32a, 33a, and 34a in the α(-) direction of the GND electrodes 31, 32, 33, and 34 are arranged along the imaginary surface P. The fourth wire 44 is electrically connected to the external surfaces 31a, 32a, 33a, and 34a of the GND electrodes 31, 32, 33, and 34 and formed to a region where the fourth wire 44 is connected to the fourth external connecting section 230d.

As shown in FIG. 3A, the external surfaces 11d and 12d in the α(+) direction of the first quarts substrate 11 and the second quartz substrate 12 and the external surface 21a in the α(+) direction of the first detection electrode 21 functioning as the first electrode are arranged to align in the γ axis direction. The first wire 41 is electrically connected to the external surface 21a of the first detection electrode 21 and formed to a region where the first wire 41 is connected to the first external connecting section 230a.

In a β axis direction sectional view of FIG. 2A shown in FIG. 3B, the external surfaces 15d and 16d in the β(-) direction of the fifth quartz substrate 15 and the sixth quartz substrate 16 and the external surface 23a in the β(-) direction of the third detection electrode 23 functioning as the third electrode are arranged to align in the γ axis direction. The third wire 43 is electrically connected to the external surface 23a of the third detection electrode 23 and formed to a region where the third wire 43 is connected to the third external connecting section 230c. The external surfaces 13d and 14d in the γ(+) direction of the third quartz substrate 13 and the fourth quartz substrate 14 and the external surface 22a in the β(+) direction of the second detection electrode 22 functioning as the second electrode are arranged to align in the γ axis direction. The second wire 42 is electrically connected to the external surface 22a of the second detection electrode 22 and formed to a region where the second wire 42 is connected to the second external connecting section 230b.

In FIG. 2B, crystal axis directions of the quartz substrates are shown in the arrangement of the quartz substrates 11, 12, 13, 14, 15, and 16 shown in FIG. 2A. An X axis of a crystal axis of a quartz substrate indicates an electrical axis, Y axis of the crystal axis indicates a mechanical axis, and a Z axis of the crystal axis indicates an optical axis. As shown in FIG. 2B, the first quartz substrate 11 and the second quartz substrate 12 are formed by substrates including the X axis and the Z axis on principal planes called Y cut substrates. The first quartz substrate 11 and the second quartz substrate 12 are combined such that crystal axis directions thereof are opposite to each other. Consequently, the first quartz substrate 11 and the second quartz substrate 12 can detect force applied in the X axis direction, i.e., force in the α axis direction. The third quartz substrate 13 and the fourth quartz substrate 14 are also formed by the Y cut substrates. The third quartz substrate 13 and the fourth quartz substrate 14 are arranged in directions rotated 90 degrees around the γ axis with respect to the arrangement of the first quartz substrate 11 and the second quartz substrate 12. The third quartz substrate 13 and the fourth quartz substrate 14 can detect force in the β axis direction, which is the X axis direction. The fifth quartz substrate 15 and the sixth quartz substrate 16 are formed by X cut substrates including the Y axis and the Z axis on principal planes. The fifth quartz substrate 15 and the sixth quartz substrate 16 are combined such that crystal axis directions thereof are opposite to each other. Consequently, the fifth quartz substrate 15 and the sixth quartz substrate 16 can detect force applied in the X axis direction, i.e., force in the γ axis direction.

The force in the α axis direction is applied to the first quartz substrate 11 and the second quartz substrate 12 in this way, whereby charges are generated. Charges are excited in the first detection electrode 21 held between the first quartz substrate 11 and the second quartz substrate 12 according to the generated charges and the force is calculated according to an amount of the charges by an arithmetic unit described below. Similarly, the force in the β axis direction detected by the third quartz substrate 13 and the fourth quartz substrate 14 is calculated according to an amount of charges detected by the second detection electrode 22. The force in the γ axis direction detected by the fifth quartz substrate 15 and the sixth quartz substrate 16 is calculated according to an amount of charges detected by the third detection electrode 23.

As explained above, the GND electrodes 31, 32, 33, and 34 are easily connected by the fourth wire 44 formed along the external surfaces 11c, 12c, 13c, 14c, 15c, and 16c of the quartz substrates 11, 12, 13, 14, 15, and 16 and are electrically connected to the external connecting section 230d. The external surfaces in the α(−) direction of the detection electrodes 21, 22, and 23 are formed to be spaced apart further to the inner side than the external surfaces 11c, 12c, 13c, 14, 15c, and 16c of the quartz substrates 11, 12, 13, 14, 15, and 16. Therefore, it is possible to prevent electrical contact with the detection electrodes 21, 22, and 23.

The first wire 41 is also formed along the external surfaces in the α(+) direction of the quartz substrates 11, 12, 13, 14, 15, and 16. However, the external surfaces in the α(+) direction of the detection electrodes 22 and 23 are formed to be spaced apart further to the inner side than the external surfaces in the α(+) direction of the quartz substrates 11, 12, 13, 14, 15, and 16. Therefore, it is possible to form the first wire 41 connectable to the external connecting section 230a while preventing electrical contact with the detection electrodes 22 and 23. The second wire 42 is also formed along the external surfaces in the β(+) direction of the quartz substrates 13, 14, 15, and 16. However, the external surface in the β(+) direction of the third detection electrode 23 is formed to be spaced apart further to the inner side than the external surfaces in the β(+) direction of the quartz substrates 13, 14, 15, and 16. Therefore, it is possible to form the second wire 42 connectable to the external connecting section 230b while preventing electrical contact with the third detection electrode 23.

Second Embodiment

Figure 4A:
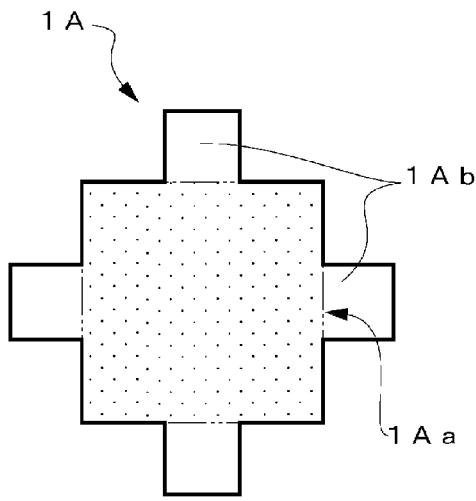
FIG. 4A is a plan view of a piezoelectric substrate of a sensor element according to a second embodiment.
Figure 4B:
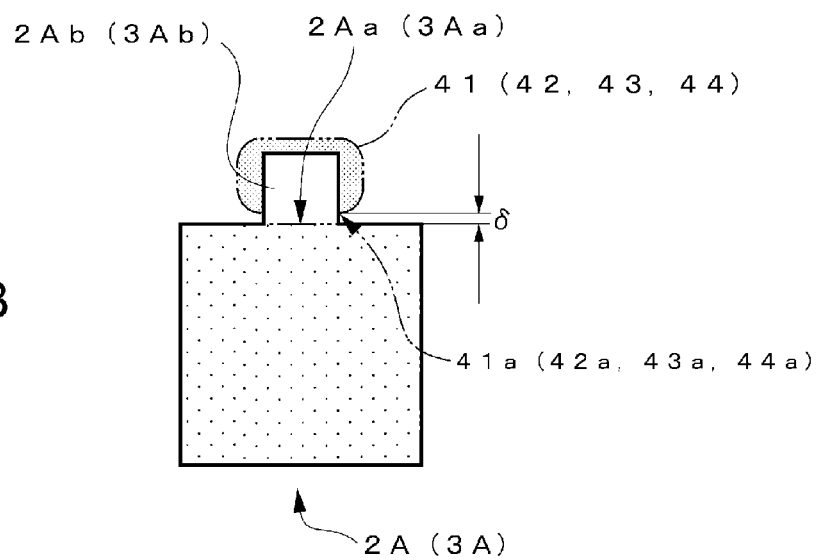
FIG. 4B is a plan view of an electrode of the sensor element.

FIGS. 4A and 4B show a sensor element according to a second embodiment. Compared with the sensor element 100 according to the first embodiment, a sensor element 110 according to the second embodiment is different in the shapes of the quartz substrates 11, 12, 13, and 14, the detection electrodes 21, 22, and 23, and the GND electrodes 31, 32, 33, and 34. The other components are substantially the same. Therefore, the same components are denoted by the same reference numerals and signs and detailed explanation of the components is omitted.

FIG. 4A is a plan view of a quartz substrate 1A functioning as a piezoelectric substrate that forms the sensor element 110 according to the second embodiment. FIG. 4B is a plan view of a detection electrode 2A functioning as a first electrode and a GND electrode 3A functioning as a second electrode. On the quartz substrate 1A shown in FIG. 4A, a substrate base section 1Aa is formed. Substrate projecting sections 1Ab are formed on the exterior of the substrate base section 1Aa. In this embodiment, the substrate projecting sections 1Ab are formed in four places.

Figure 5:
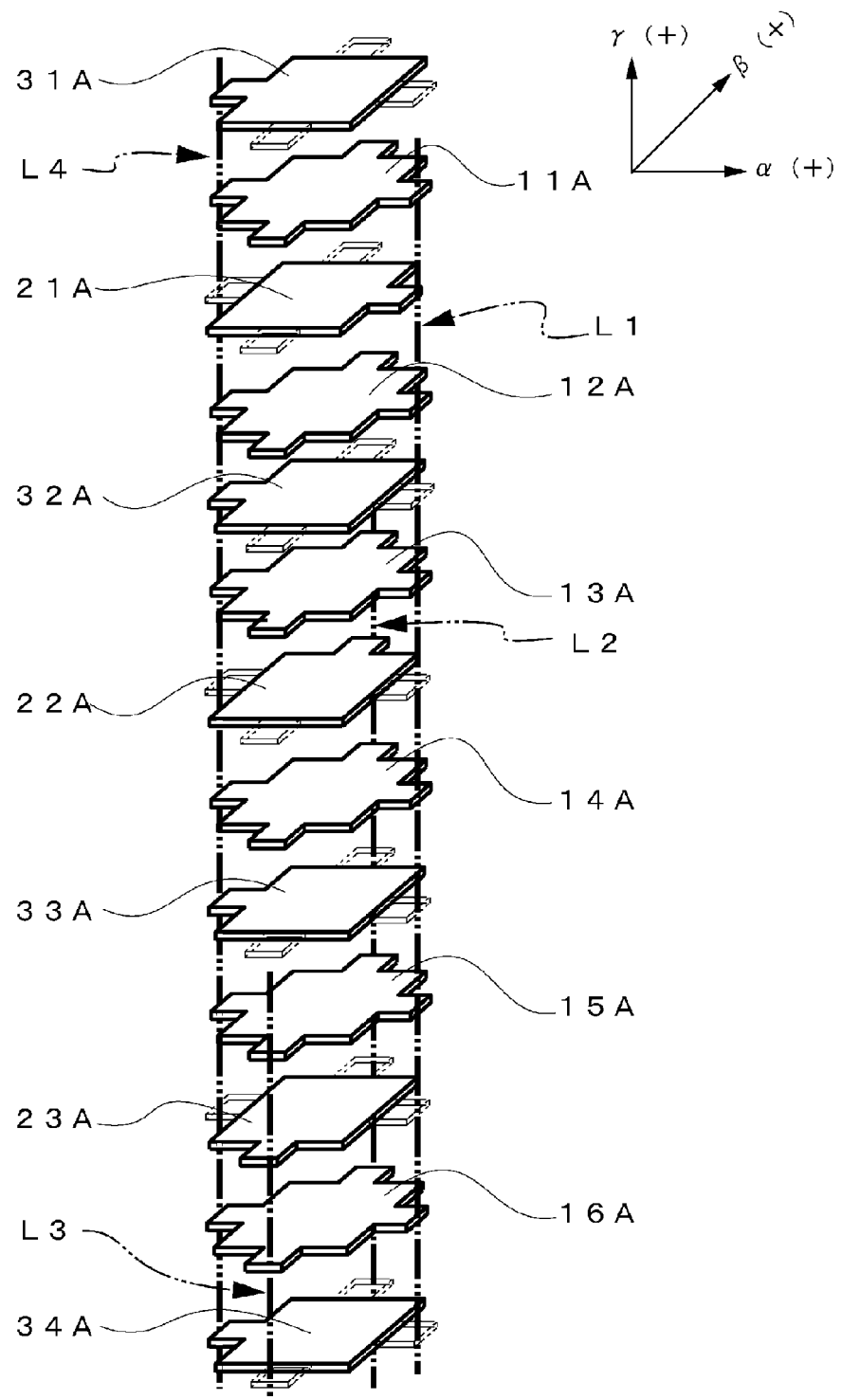
FIG. 5 is an exploded perspective view showing arrangement in the sensor element according to the second embodiment.

On the detection electrode 2A or the GND electrode 3A shown in FIG. 4B, a detection electrode base section 2Aa or a GND electrode base section 3Aa is formed. A detection electrode projecting section 2Ab or a GND electrode projecting section 3Ab is formed on the exterior of the detection electrode base section 2Aa or the GND electrode base section 3Aa. In this embodiment, the detection electrode projecting section 2Ab or the GND electrode projecting section 3Ab is formed in one place. As shown in FIG. 5, the quartz substrate 1A shown in FIG. 4A and the detection electrode 2A or the GND electrode 3A shown in FIG. 4B are laminated in the γ axis direction to form a sensor element 110 like the sensor element 100 according to the first embodiment. FIG. 5 is an assembled exploded perspective view of the sensor element 110 equivalent to FIGS. 2A and 2B, which are assembled perspective views of the sensor element 100 according to the first embodiment.

As shown in FIG. 5, in the sensor element 110, substrates having the shape of the quartz substrate 1A are laminated along the crystal axis direction shown in FIGS. 2A and 2B in the order of a first quartz substrate 11A, a second quartz substrate 12A, . . . , and a sixth quartz substrate 16A. Electrodes having the shape of the GND electrode 3A are laminated with an incorporating direction of the GND electrode projecting section 3Ab set on, in this embodiment, a line L4 in the α(−) direction. A first GND electrode 31A is arranged on an upper side in the figure of the first quartz substrate 11A, a second GND electrode 32A is arranged between the second quartz substrate 12A and the third quartz substrate 13A, a third GND electrode 33A is arranged between the fourth quartz substrate 14A and the fifth quartz substrate 15A, and a fourth GND electrode 34A is arranged on a lower side in the figure of the sixth quartz substrate 16A.

The detection electrodes 2A are laminated to be held among the quartz substrates 1A that detect forces in the α, β, and γ axis directions and arranged such that laminating directions of the respective detection electrode projecting sections 2Ab do not overlap in the γ axis direction. Specifically, as shown in FIG. 5, a first detection electrode 21A is arranged between the first quartz substrate 11A and the second quartz substrate 12A that detect the force in the α axis direction and the electrode projecting sections are laminated along a line L1 in the α(+) direction. A second detection electrode 22A is arranged between the third quartz substrate 13A and the fourth quartz substrate 14A that detect the force in the β axis direction and the electrode projecting sections are laminated along a line L2 in the β(+) direction. A third detection electrode 23A is arranged between the fifth quartz substrate 15A and the sixth quartz substrate 16A that detect the force in the γ axis direction and the electrode projecting sections are laminated along a line L3 in the β(−) direction.

The electrode projecting sections are arranged as explained above to be electrically connected by the wires 41, 42, 43, and 44. Specifically, although not shown in FIG. 5, the first wire 41 is formed along the line L1, the second wire 42 is formed along the line L2, the third wire 43 is formed along the line L3, and the fourth wire 44 is formed along the line L4. When the wires are formed, as shown in FIG. 4B, the wires 41, 42, 43, and 44 are formed and arranged along the external section of the detection electrode projecting section 2Ab or the GND electrode projecting section 3Ab. However, ends 41a, 42a, 43a, and 44a of the wires 41, 42, 43, and 44 are formed to be spaced apart from the electrode base sections 2Aa and 3Aa to secure a gap δ. By forming the wires 41, 42, 43, and 44 in this way, short-circuit among the electrodes is prevented when the wires 41, 42, 43, and 44 are extended in the γ axis direction.

In the sensor element 100 according to the first embodiment and the sensor element 110 according to the second embodiment, a form of the GND electrodes and the detection electrodes is not limited to the form of a tabular electrode plate shown in the figures. For example, the GND electrodes and the detection electrodes may be electrode films obtained by forming conductive metal such as Au, Ag, Cu, or W on a principal plane of a quartz substrate with an evaporation method, a sputtering method, or the like. The wires 41, 42, 43, and 44 may be formed by applying, for example, conductive paste. The wires 41, 42, 43, and 44 may be wiring films obtained by fixedly attaching the quartz substrates and the electrodes of the sensor elements 100 and 110 and forming conductive metal such as Au, Ag, Cu, or W in forming regions of the wires 41, 42, 43, and 44 with the evaporation method, the sputtering method, or the like.

Third Embodiment

Figure 6:
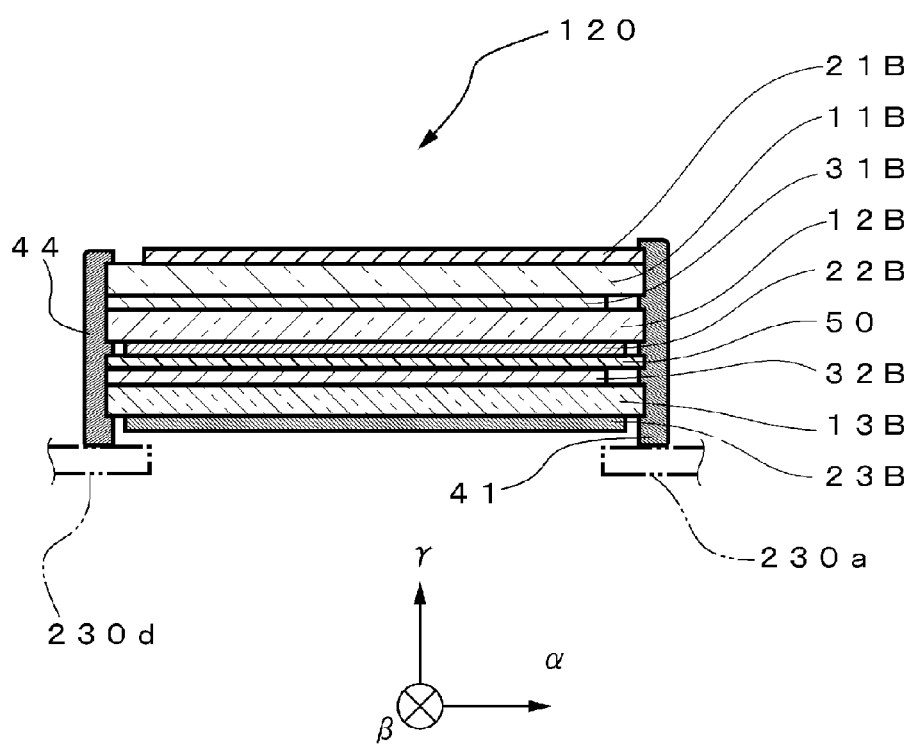
FIG. 6 is a sectional view of a sensor element according to a third embodiment.

FIG. 6 is a sectional view of a sensor element according to a third embodiment. In the sensor element 100 according to the first embodiment, each of the forces in the α, β, and γ axis directions is generated by using the two quartz substrates functioning as the piezoelectric substrates, i.e., the forces are generated by using the six quartz substrates. On the other hand, in a sensor element 120 according to the third embodiment, each of the forces in the α, β, and γ axis directions is generated by using one quartz substrate, i.e., the forces are generated by using the three quartz substrates. Therefore, in the explanation of the sensor element 120 according to the third embodiment, explanation of components that are the same as those of the sensor element 100 according to the first embodiment is omitted. The same components are denoted by the same reference numerals and signs.

In the sensor element 120 shown in FIG. 6, a first quartz substrate 11B functioning as a first piezoelectric substrate, a second quartz substrate 12B functioning as a second piezoelectric substrate, and a third quartz substrate 13B functioning as a third piezoelectric substrate are used. Electrodes are arranged on the quartz substrates 11B, 12B, and 13B as explained below.

On the first quartz substrate 11B, a first detection electrode 21B functioning as a first electrode is arranged on one principal plane of the first quartz substrate 11B, i.e., in FIG. 6 showing this embodiment, an upper side in the figure of the first quartz substrate 11B. A first GND electrode 31B functioning as a second electrode is arranged on the other principal plane of the first quartz substrate 11B. On the first quartz substrate 11B side of the second quartz substrate 12B, a first GND electrode 31B functioning as a fourth electrode is arranged to be shared with the first quartz substrate 11B and is held between the first quartz substrate 11B and the second quartz substrate 12B. A second detection electrode 22B functioning as a third electrode is arranged on the opposite side of the first quartz substrate 11B side of the second quartz substrate 12B.

On the third quartz substrate 13B, in an example shown in FIG. 6 of this embodiment, a second GND electrode 32B functioning as a sixth electrode is arranged on a principal plane side on the second quartz substrate 12B side (an upper side in the figure). A third detection electrode 23B is arranged on the other principal plane side (a lower side in the figure). A nonconductive insulating section 50 is arranged between the second detection electrode 22B of the second quartz substrate 12B and the second GND electrode 32B of the third quartz substrate 13B in order to prevent electrical short circuit of the second detection electrode 22B and the second GND electrode 32B. The insulating section 50 is desirably formed of a material having nonconductivity and not having elasticity for relaxing force applied to the sensor element 120. For example, a nonconductive high-rigidity material such as ceramics, a nonconductive film of, for example, $SiO_2$, TiN, or $Al_2O_3$ formed by a film forming technique, or the like is suitably used.

In the sensor element 120 configured as explained above, the first quartz substrate 11B and the second quartz substrate 12B are formed from a Y cut quartz substrate. The first quartz substrate 11B and the second quartz substrate 12B can detect forces in the α axis direction and the β axis direction by shifting rotating positions 90 degrees around the γ axis. The third quartz substrate 13B is formed from an X cut quartz substrate. The third quartz substrate 13B can detect the force in the γ axis direction.

The arrangement of the detection electrodes and the GND electrodes is not limited to the above-described form shown in FIG. 6. The insulating section 50 should be arranged at least in a region where the electrodes are in contact with each other. The form may be combined with the form for detecting one direction using the two quartz substrates included in the sensor element 100 according to the first embodiment.

Figure 7A:
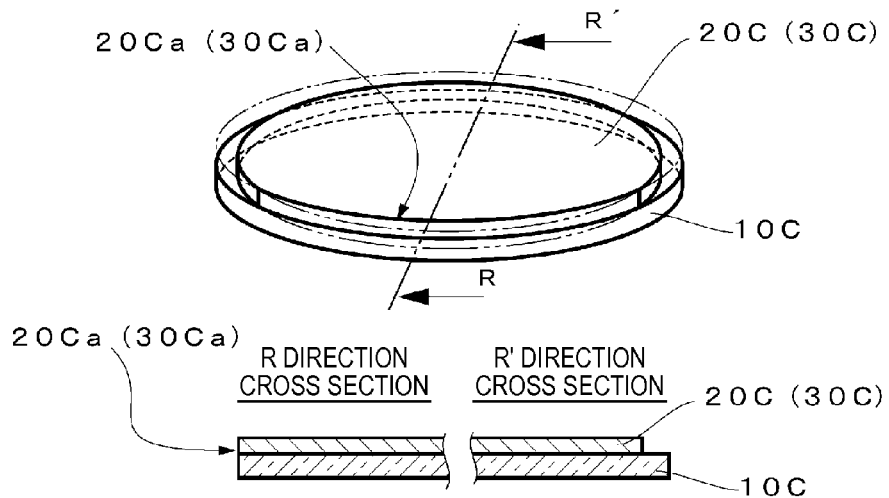
FIGS. 7A and 7B are perspective views and sectional views showing other forms of piezoelectric substrates and electrodes included in the sensor element.
Figure 7B:
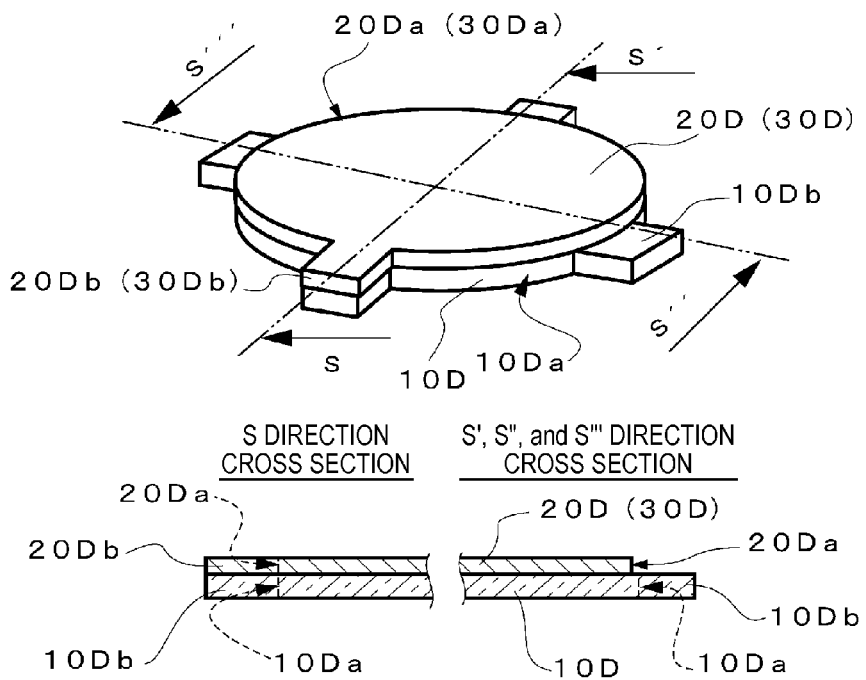

Concerning the sensor elements 100, 110, and 120 explained above, a plane shape of the piezoelectric substrates and the electrodes included in the sensor elements 100, 110, and 120 is not limited to the form explained above and may be a shape illustrated in FIGS. 7A and 7B. FIG. 7A shows a perspective view of a piezoelectric substrate 10C and a detection electrode 20C or a GND electrode 30C having a circular exterior and a sectional view of an R-R' portion. FIG. 7B shows a perspective view of a piezoelectric substrate 10D including substrate projections 10Db in an exterior of a substrate base section 10Da, which has a circular exterior, and a detection electrode 20D or a GND electrode 30D and a sectional view of S-S', -S", and -S'" portions. The exterior of the piezoelectric substrate 10C shown in FIG. 7A is formed in a substantially circular shape. The exterior of the detection electrode 20C or the GND electrode 30C combined with the piezoelectric substrate 10C is also formed in a substantially circular shape. In this case, a connecting section 20Ca or 30Ca, which is connected by a wire, of the detection electrode 20C or the GND electrode 30C is formed to overlap the exterior of the piezoelectric substrate 10C. The other sections of the detection electrode 20C or the GND electrode 30C are formed such that the exterior of the detection electrode 20C or the GND electrode 30C is further on the inner side than the exterior of the piezoelectric substrate 10C, as shown in the sectional view in the R' direction of FIG. 7A.

The piezoelectric substrate 10D shown in FIG. 7B includes the substrate base section 10Da having an exterior of a substantially circular shape and the substrate projections 10Db on the outer periphery of the substrate base section 10Da. The detection electrode 20D or the GND electrode 30D combined with the piezoelectric substrate 10D includes a detection electrode base section 20Da or a GND electrode base section 30Da having a shape substantially the same as the shape of the substrate base section 10Da. The detection electrode 20D or the GND electrode 30D includes a detection electrode projecting section 20Db or a GND electrode projecting section 30Db in at least one place in an external section of the detection electrode base section 20Da or the GND electrode base section 30Da. The detection electrode projecting section 20Db or the GND electrode projecting section 30Db is laminated on any one of the substrate projection 10Db to form a wire connected to the detection electrode projecting section 20Db or the GND electrode projecting section 30Db. Since a connecting method for the wire is the same as that in the second embodiment, a detailed explanation of the connecting method is omitted. The piezoelectric substrates and the electrodes formed as the sensor element are not limited to the shapes shown in FIGS. 7A and 7B. The piezoelectric substrates only have to be formed to include the electrodes formed such that a part of the exterior thereof aligns with at least a part of the exterior of the piezoelectric substrate.

Fourth Embodiment

Figure 8:
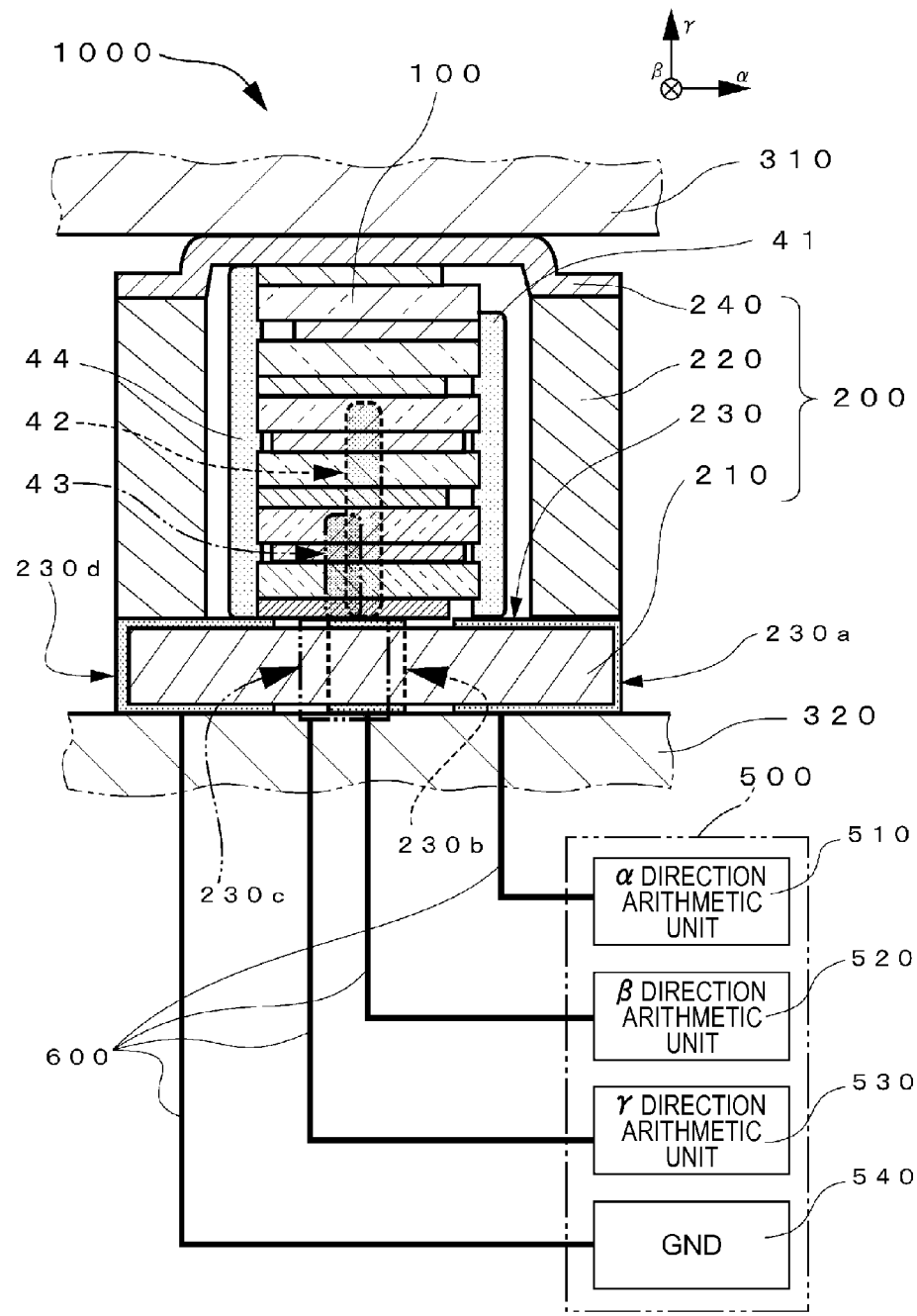
FIG. 8 is a configuration diagram showing a force detecting device according to a fourth embodiment.

FIG. 8 is a schematic sectional view showing a force detecting device 1000 according to a fourth embodiment. As shown in FIG. 8, in the force detecting device 1000, any one of the sensor elements 100, 110, and 120, in this embodiment, the sensor element 100 is housed in a container 200 (hereinafter referred to as package 200). The force detecting device 1000 is electrically connected to an arithmetic unit 500 via an external connecting section 230 formed in the package 200. In the package 200, a first package substrate 210 formed of ceramics and a second package substrate 220 formed of ceramics in a frame shape are joined by a known joining method. The sensor element 100 is housed in a housing space. An opening section opposite to a joining section of the second package substrate 220 to the first package substrate 210 is joined, desirably air-tightly, to the section of a lid joining surface 220a of the second package substrate 220 using a lid 240 of metal by the known joining method.

The sensor element 100 is housed in the inside of the package 200 kept air tight in this way. Consequently, it is possible to inhibit the influence of an external environment, for example, intrusion of liquid water, oil, or the like into the housing section of the sensor element 100 and maintain the durability of the sensor element 100 for a long period. Further, air tightness of joining sections of the second package substrate 220 and the first package substrate 210 and the lid 240 is increased. Consequently, it is possible to inhibit intrusion of gas such as intrusion of corrosive gas and intrusion of water vapor and maintain the durability of the sensor element 100 for a longer period. It is also possible to keep the sensor element 100 air tight by molding (covering) the sensor element 100 with resin besides the ceramics package 200.

The lid 240 is desirably formed of metal having elasticity to press the sensor element 100 in the laminating direction of the substrates and the electrodes of the sensor element 100 with predetermined pressure in a state in which the lid 240 is joined to the second package substrate 220. The lid 240 is more desirably formed of metal that is also excellent in corrosion resistance such as stainless steel, a titanium alloy, or an aluminum alloy.

On the first package substrate 210, the external connecting section 230 is formed as a connection electrode. The external connecting section 230 is formed to be electrically connected to the wires 41, 42, 43, and 44 formed in the sensor element 100 housed in the inside of the package 200 and to be electrically connected to a connection wire 600 connected to the arithmetic unit 500. When the external connecting section 230 is made of a conductive material, for example, a metal material such as Au, W, Ag, or Cu, the external connecting section 230 is formed as a film on the first package substrate 210 by a method such as a sputtering method, an evaporation method, or a CVD. When the external connecting section 230 is made of an organic material such as conductive paste, the external connecting section 230 is formed by a method such as printing or application.

As explained above, the sensor element 100 is pressed against the first package substrate 210 by the lid 240. The first wire 41 formed in the sensor element 100 is connected to the first external connecting section 230a, the second wire 42 is connected to the second external connecting section 230b, the third wire 43 is connected to the third external connecting section 230c, and the fourth wire 44 is connected to the fourth external wiring section 230d. The first detection electrode 21 connected to the first wire 41 is connected to an α axis direction arithmetic unit 510. The second detection electrode 22 connected to the second wire 42 is connected to a β axis direction arithmetic unit 520. The third detection electrode 23 connected to the third wire 43 is connected to a γ axis direction arithmetic unit 530. The GND electrodes 31, 32, 33, and 34 connected to the fourth wire 44 are connected to a GND 540 (see FIGS. 1A to 3B). The force detecting device 1000 is held, pressed, and fixed by bases 310 and 320 of a not-shown device to be detected. The arithmetic unit 500 includes a QV amplifier that converts charges of the detection electrodes 21, 22, and 23. The arithmetic unit 500 detects and calculates force applied to the device to be detected via the bases 310 and 320.

Figure 9:
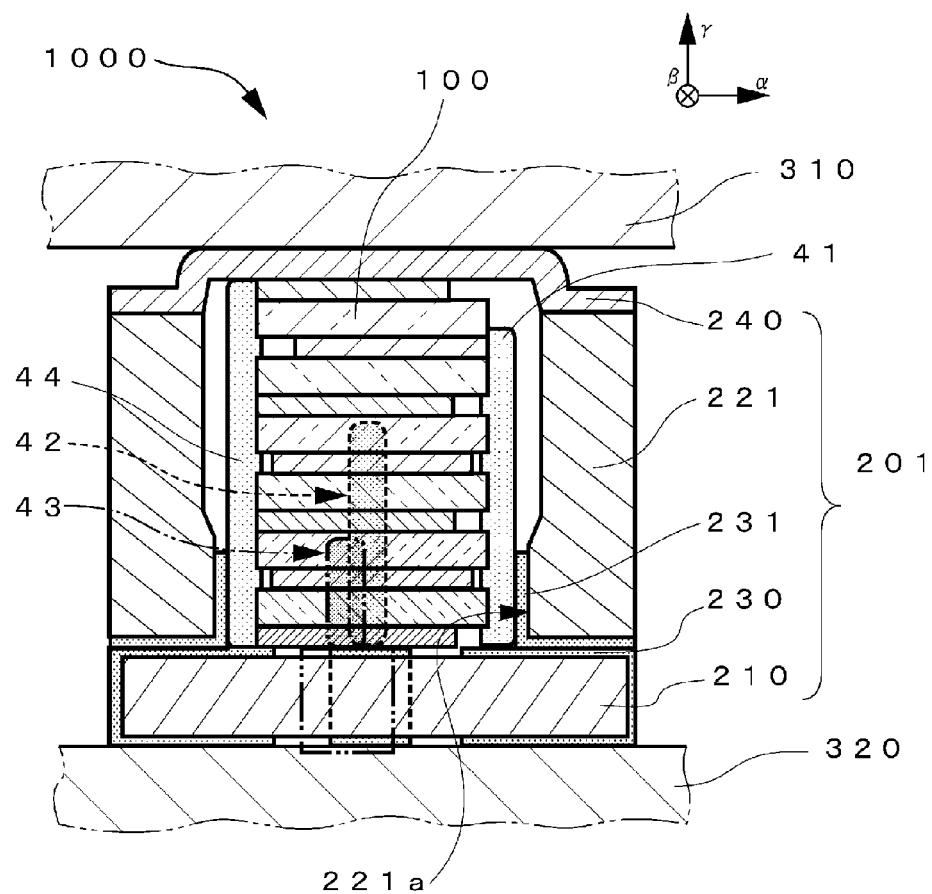
FIG. 9 is a sectional view showing another form of the force detecting device according to the fourth embodiment.

The force detecting device 1000 includes the package 200 formed by using ceramics, which is an insulator. Therefore, the connecting section functioning as the connection electrode can be easily formed in the inside of the package 200. Further, as in a package 201 shown in FIG. 9 as another example of the fourth embodiment, an electrode 231 connectable to an electrode forming section 221a and the wires 41, 42, 43, and 44 in a side surface section is formed adjacent to a connecting section of the second package substrate 221 to the first package substrate 210. Consequently, it is possible to further increase an electrical connection area and further improve reliability and stability of connection.

The force detecting device 1000 according to this embodiment can be easily handled and can be reduced in size by housing the sensor elements 100, 110, and 120 according to the embodiments explained above in the package 200 or the package 201. Therefore, it is possible to easily set the force detecting device 1000 even in an apparatus having a narrow attachment space such as a robot.

Figure 10A:
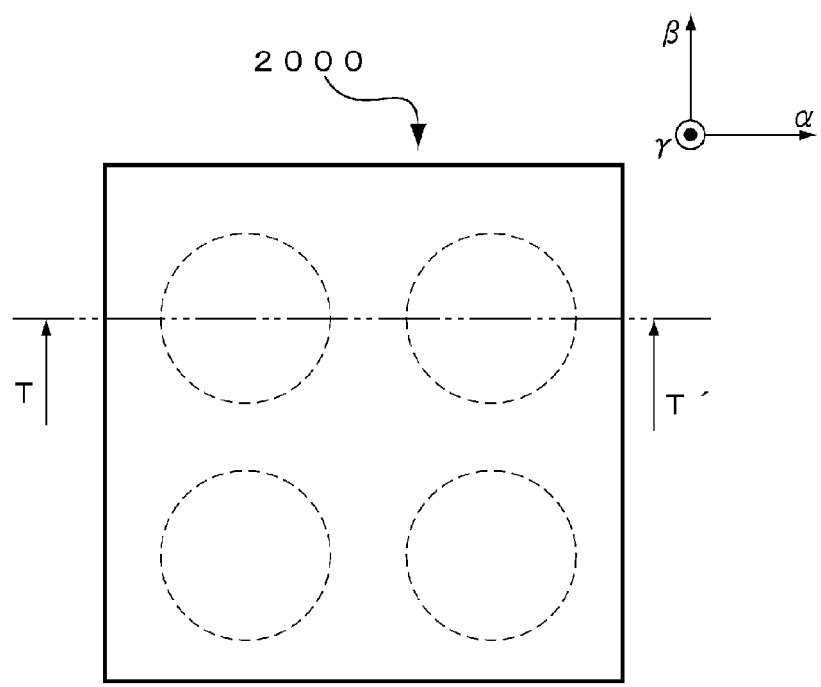
FIG. 10A is a plan view of a six-axis force detecting device in which the force detecting device according to the fourth embodiment is used.
Figure 10B:
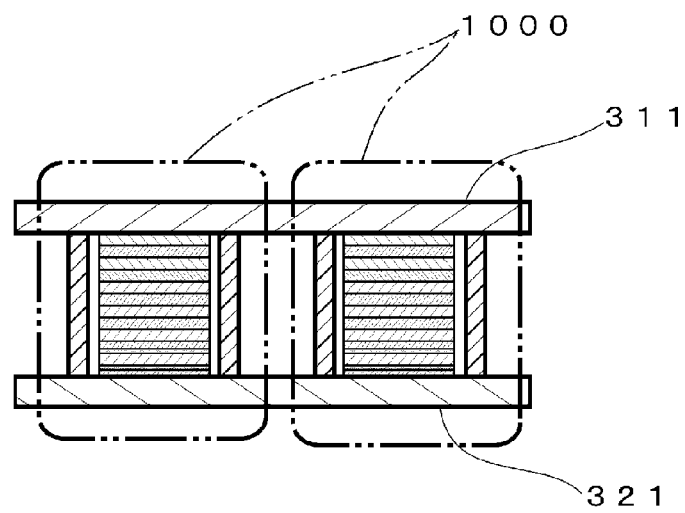
FIG. 10B is a sectional view of the six-axis force detecting device.

FIGS. 10A and 10B schematically show a six-axis force detecting device 2000 that enables torque detection using the force detecting device 1000 according to the fourth embodiment. FIG. 10A is a plan view and FIG. 10B is a sectional view of a T-T' portion shown in FIG. 10A. As shown in FIGS. 10A and 10B, the six-axis force detecting device 2000 has a configuration in which four force detecting devices 1000 are fixed by bases 311 and 321. By adopting this form of the six-force detecting device 2000, it is possible to calculate torque around each of the α axis, the β axis, and the γ axis according to a distance among the arranged four force detecting devices 1000 and force obtained by each of the force detecting devices 1000.

Fifth Embodiment

Figure 11:
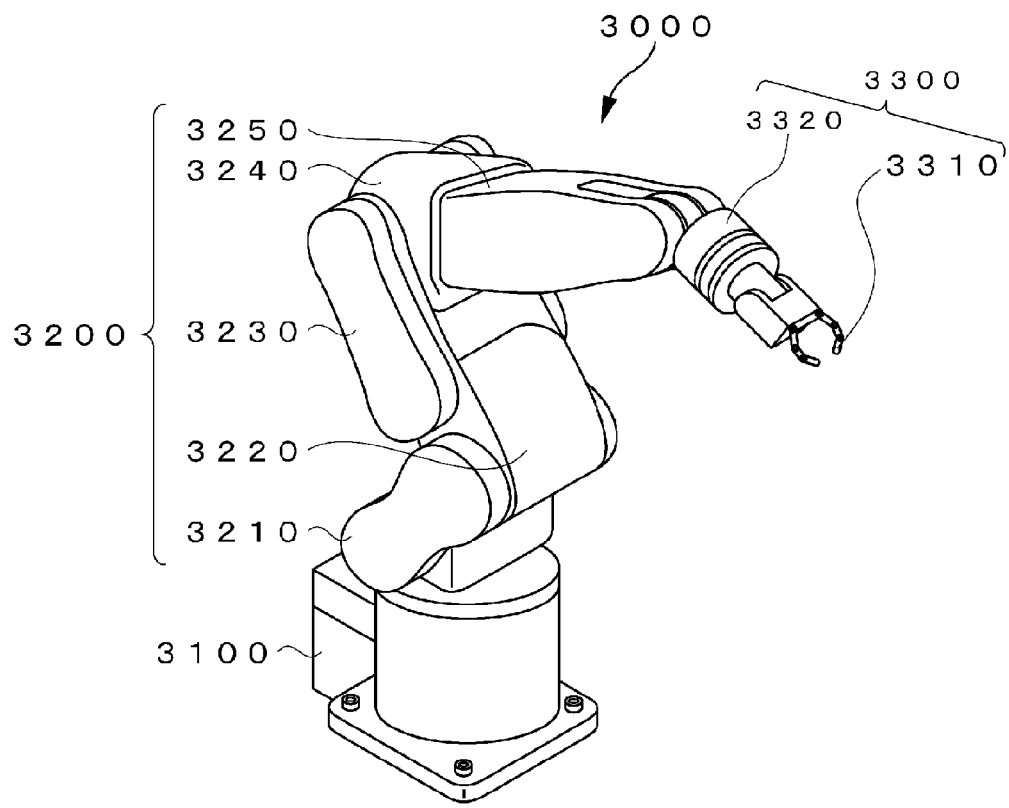
FIG. 11 is a perspective view showing a robot according to a fifth embodiment.

FIG. 11 is an external view showing a robot 3000 in which the force detecting device 1000 according to the third embodiment or the six-axis force detecting device 2000 is used. The robot 3000 includes a main body section 3100, an arm section 3200, and a robot hand section 3300. The main body section 3100 is fixed on, for example, a floor, a wall, a ceiling, or a movable truck. The arm section 3200 is provided to be movable with respect to the main body section 3100. A not-shown actuator that generates power for rotating the arm section 3200, a control unit that controls the actuator, and the like are incorporated in the main body section 3100.

The arm section 3200 includes a first frame 3210, a second frame 3220, a third frame 3230, a fourth frame 3240, and a fifth frame 3250. The first frame 3210 is connected to the main body section 3100 via a rotating and bending shaft to be capable of rotating or bending. The second frame 3220 is connected to the first frame 3210 and the third frame 3230 via a rotating and bending shaft. The third frame 3230 is connected to the second frame 3220 and the fourth frame 3240 via a rotating and bending shaft. The fourth frame 3240 is connected to the third frame 3230 and the fifth frame 3250 via a rotating and bending shaft. The fifth frame 3250 is connected to the fourth frame 3240 via a rotating and bending shaft. The frames 3210 to 3250 rotate or bend in a compound manner around the rotating and bending shafts according to the control by the control unit, whereby the arm section 3200 operates.

In the fifth frame 3250 of the arm section 3200, the robot hand section 3300 is attached to the other side of a connecting section to the fourth frame 3240. The robot hand section 3300 includes a robot hand 3310 capable of gripping an object and a robot-hand connecting section 3320 incorporating a motor that rotates the robot hand 3310 to operate. The robot hand section 3300 is connected to the fifth frame 3250 by the robot-hand connecting section 3320.

The force detecting device 1000 according to the third embodiment or the six-axis force detecting device 2000 is incorporated in the robot-hand connecting section 3320 in addition to the motor. When the robot hand section 3300 is moved to a predetermined operating position according to the control by the control unit, it is possible to detect, for example, contact with an obstacle or contact with a target due to a command to operate beyond the predetermined position as force using the force detecting device 1000 or the six-axis force detecting device 2000, feedback the force to the control unit of the robot 3000, and cause the robot 3000 to execute an avoiding action.

By using such a robot 3000, it is possible to obtain a robot capable of performing safe and fine work and easily performing an obstacle avoiding action, an object damage avoiding action, and the like, which cannot be dealt with by the position control in the past. The invention is not limited to the embodiments and can be applied to, for example, a double arm robot.

The entire disclosure of Japanese Patent Application No. 2011-244212 filed Nov. 8, 2011 is expressly incorporated by reference herein.

What is claimed is:

1. A sensor element in which piezoelectric substrates and electrodes are laminated together, the sensor element comprising:
a first wire electrically connects a first detection electrode and a first external connecting section, a second wire electrically connects a second detection electrode and a second external connecting section, a third wire electrically connects the third detection electrode and a third external connecting section, a fourth wire electrically connects a plurality of GND electrodes and a fourth external connecting section.

2. The sensor element according to claim 1, wherein the first detection electrode shared with a first quartz substrate is provided on one principal plane side of the second quartz substrate, the second GND electrode of the second quartz substrate is provided on the other principal plane side as a fourth electrode to be shared with a third quartz substrate, the second detection electrode functioning as the third electrode shared with a third quartz substrate is provided on one principal plane side of a fourth quartz substrate, the first wire, the second wire, the third wire, and the fourth wire are on outer peripheral sections of the laminated piezoelectric substrates.

3. The sensor element according to claim 1, wherein the first to third piezoelectric substrates are quartz, and the first and second piezoelectric substrates are Y cut substrates and the third piezoelectric substrate is an X cut substrate.

4. A force detecting device comprising:
a sensor element including, a sensor element in which piezoelectric substrates and electrodes are laminated together,
a first wire electrically connects a first detection electrode and a first external connecting section, a second wire electrically connects a second detection electrode and a second external connecting section, a third wire electrically connects the third detection electrode and a third external connecting section, a fourth wire electrically connects a plurality of GND electrodes and a fourth external connecting section.

5. The force detecting device according to claim 4, wherein the first detection electrode shared with a first quartz substrate is provided on one principal plane side of the second quartz substrate, the second GND electrode of the second quartz substrate is provided on the other principal plane side as a fourth electrode to be shared with a third quartz substrate, the second detection electrode functioning as the third electrode shared with a third quartz substrate is provided on one principal plane side of a fourth quartz substrate, the first wire, the second wire, the third wire, and the fourth wire are on outer peripheral sections of the laminated piezoelectric substrates.

6. The force detecting device according to claim 4, wherein the first to third piezoelectric substrates are quartz, and the first and second piezoelectric substrates are Y cut substrates and the third piezoelectric substrate is an X cut substrate.

7. The force detecting device according to claim 4, wherein the sensor element is housed in a housing container including a housing section that houses the sensor element, and in the housing container, the first, second, third, and fourth external connecting sections are extended to the housing section, and the first, second, third, and fourth conductors of the sensor element and the first, second, third, and fourth external connecting sections are electrically connected.

8. The force detecting device according to claim 7, wherein the housing container includes a cylindrical housing container body, a housing container substrate arranged in one opening section of the housing container body, and a lid body arranged in the other opening section, the housing section is defined by the housing container substrate and the lid body being joined to the housing container body, and at least the housing container body and the hosing container substrate are ceramic.

9. A robot comprising a force detecting device including: a first wire electrically connects a first detection electrode and a first external connecting section, a second wire electrically connects a second detection electrode and a second external connecting section, a third wire electrically connects the third detection electrode and a third external connecting section, a fourth wire electrically connects a plurality of GND electrodes and a fourth external connecting section.

10. The robot according to claim 9, wherein the first detection electrode shared with a first quartz substrate is provided on one principal plane side of the second quartz substrate, the second GND electrode of the second quartz substrate is provided on the other principal plane side as a fourth electrode to be shared with a third quartz substrate, the second detection electrode functioning as the third electrode shared with a third quartz substrate is provided on one principal plane side of a fourth quartz substrate. the first wire, the second wire, the third wire, and the fourth wire are on outer peripheral sections of the laminated piezoelectric substrates.

11. The robot according to claim 9, wherein the first to third piezoelectric substrates quartz, and the first and second piezoelectric substrates are Y cut substrates and the third piezoelectric substrate is an X cut substrate.

12. The robot according to claim 9, wherein the sensor element is housed in a housing container including a housing section that houses the sensor element, and in the housing container, the first, second, third, and fourth external connecting sections are extended to the housing section, and the first, second, third, and fourth conductors of the sensor element and the first, second, third, and fourth external connecting sections are electrically connected.

13. The robot according to claim 12, wherein the housing container includes a cylindrical housing container body, a housing container substrate arranged in one opening section of the housing container body, and a lid body arranged in the other opening section, the housing section is defined by the housing container substrate and the lid body being joined to the housing container body, and at least the housing container body and the hosing container substrate are ceramic.

14. The sensor element according to claim 2, wherein the first quartz substrate and the second quartz substrate are formed by substrates including the X axis and the Z axis on principal planes called Y cut substrates, the third quartz substrate and the fourth quartz substrate are also formed by the Y cut substrates, the third quartz substrate and the fourth quartz substrate are arranged in directions rotated 90 degrees with respect to the arrangement of the first quartz substrate and the second quartz substrate. the fifth quartz substrate and the sixth quartz substrate are formed by X cut substrates including the Y axis and the Z axis on principal planes, the fifth quartz substrate and the sixth quartz substrate are combined such that crystal axis directions thereof are opposite to each other.

15. A force detecting device according to claim 5, wherein the first quartz substrate and the second quartz substrate are formed by substrates including the X axis and the Z axis on principal planes called Y cut substrates, the third quartz substrate and the fourth quartz substrate are also formed by the Y cut substrates, the third quartz substrate and the fourth quartz substrate are arranged in directions rotated 90 degrees with respect to the arrangement of the first quartz substrate and the second quartz substrate, the fifth quartz substrate and the sixth quartz substrate are formed by X cut substrates including the Y axis and the Z axis on principal planes, the fifth quartz substrate and the sixth quartz substrate are combined such that crystal axis directions thereof are opposite to each other.

16. A robot according to claim 10, wherein the first quartz substrate and the second quartz substrate are formed by substrates including the X axis and the Z axis on principal planes called Y cut substrates, the third quartz substrate and the fourth quartz substrate are also formed by the Y cut substrates, the third quartz substrate and the fourth quartz substrate are arranged in directions rotated 90 degrees with respect to the arrangement of the first quartz substrate and the second quartz substrate, the fifth quartz substrate and the sixth quartz substrate are formed by X cut substrates including the Y axis and the Z axis on principal planes, the fifth quartz substrate and the sixth quartz substrate are combined such that crystal axis directions thereof are opposite to each other.

17. A force detecting device according to claim 15, wherein charges are excited in the detection electrode held between the quartz substrates according to the generated charges and the force is calculated by an arithmetic unit.

18. The robot according to claim 16, wherein charges are excited in the detection electrode held between the quartz substrates according to the generated charges and the force is calculated by an arithmetic unit.

19. The robot according to claim 16, wherein the sensor element is housed in a housing container, the first external connecting section, the second external connecting section, the third external connecting section, and the fourth external connecting section are provided in the housing container, the first conductor and the first external connecting section are electrically connected, the second conductor and the second external connecting section are electrically connected, the third conductor and the third external connecting section are electrically connected, and the fourth conductor and the fourth external connecting section are electrically connected.

20. The robot according to claim 19, wherein the housing container includes a cylindrical housing container body, a housing container substrate arranged in one opening section of the housing container body, and a lid body arranged in the other opening section, the housing section is defined by the housing container substrate and the lid body being joined to the housing container body, and at least the housing container body and the hosing container substrate are ceramic.

* * * * *